United States Patent [19]

Yamaguchi

[11] Patent Number: 4,501,996
[45] Date of Patent: Feb. 26, 1985

[54] DEFLECTION DISTORTION CORRECTING CIRCUIT

[75] Inventor: Hidefumi Yamaguchi, Fujisawa, Japan

[73] Assignee: International Business Machines Corporation, Armonk, N.Y.

[21] Appl. No.: 601,112

[22] Filed: Apr. 18, 1984

Related U.S. Application Data

[63] Continuation of Ser. No. 474,406, Mar. 11, 1983.

[30] Foreign Application Priority Data

Mar. 19, 1982 [JP] Japan ................................. 57-43065

[51] Int. Cl.³ .............................................. H01J 29/56
[52] U.S. Cl. ................................................... 315/371
[58] Field of Search ........................ 315/371, 370, 382

[56] References Cited

U.S. PATENT DOCUMENTS 3,713,001  1/1973  Waehner et al. .
3,740,611  6/1973  Slavik .
3,825,796  7/1974  Bello .

FOREIGN PATENT DOCUMENTS 2327689  10/1975  France .

Primary Examiner—Theodore M. Blum
Attorney, Agent, or Firm—Frederick D. Poag

[57] ABSTRACT

A deflection distortion correcting circuit for CRT display with interlaced scanning is disclosed, which correct concurrently both linearity of vertical deflection and pairing of horizontal interlaced scanning lines which is caused by variation in anode voltage. This can be achieved simply and easily by combining an adder with a conventional cubic curve linearity correction circuit to introduce a pairing correcting component related to the variation in anode voltage into the cubic curve linearity correction.

1 Claim, 4 Drawing Figures

DEFLECTION DISTORTION CORRECTING CIRCUIT

This application is a continuation of application Ser. No. 474,406, filed 3/11/83.

BACKGROUND OF THE INVENTION

1. Field of the Invention

This invention relates to a deflection distortion correcting circuit and more particularly to a deflection distortion correcting circuit for easily correcting both linearity of deflection and pairing of scanning lines in cathode ray tube display using interlaced scanning.

2. Prior Art

Cathode ray tube (hereinafter referred to as CRT) displays are widely used as computer terminals. One of the problems related to the deflecting system of CRT display is linearity. This is a phenomenon that deflection per unit deflection angle becomes larger in the periphery of the screen than the center because the radius of curvature of the tube surface is larger than the distance between the center of beam deflection and the tube surface. In order to solve the problem of deflection linearity, S-correction using the LC resonance or cubic curve correction using multipliers has been known. By these correction techniques, deflection linearity can be corrected to a degree that there is no practical problem.

On the other hand, ordinary CRT displays use horizontal raster scanning, and in order to minimize flicker, interlaced scanning is used. Normally, 2:1 interlaced scanning wherein two fields, odd and even, constitute one frame is used. When interlaced scanning is used, another problem was found to arise especially when display with high resolution is constituted.

The anode current of a CRT increases when luminance is high and decreases when luminance is low. Since the output impedance of a high-voltage circuit is large, the anode voltage decreases with the increase of the anode current, and increases with the decrease of the anode current. The change in the anode voltage varies deflection sensitivity. Normally the variation of the anode voltage due to change in the anode current appears relatively slowly due to the action of capacitance of the anode. When interlaced scanning is not used, therefore, the position of the raster is only deviated partly or wholly and there is no practical problem. Especially when the deflection angle is as small as 70°-90°, the deviation of position of scanning lines due to change in the anode voltage is insignificant.

When interlaced scanning is used, however, there is normally difference between luminance levels in odd and even fields. This will be understood from the fact that when a character E is displayed on a 7×9 dot matrix, the first, fifth and ninth scanning lines are especially bright, leading odd field to have high luminance in this area and even field to have low luminance. When there is difference between the anode voltages in odd and even fields, the distances between odd and even scanning lines adjacent to each other become uneven and the scanning lines approach each other, causing so-called pairing phenomenon. In the worst case, odd and even scanning lines may overlap or change places with each other. The higher the scanning line density and the larger the deflection angle in the vertical direction, the more remarkable pairing appears. Since a larger deflection angle makes deflection sensitivity at the upper and lower parts of the screen larger, pairing is caused by small change in the anode voltage. For instance, when a wide angle CRT with a deflection angle of 114° and a screen size of 17 inches is used with its long axis placed vertically to operate as a full page text display and interlaced scanning is carried out at a high density of about 100 lines/3 cm, pairing is caused unless the fluctuation of the anode voltage is controlled within ±0.04%. This value is practically nearly unachievable, and even if a considerable stabilization can be achieved by the use of a high precision voltage regulator or a large capacity power source, it will be very costly and bulky.

It is therefore necessary in high resolution CRT display using interlaced scanning to solve the problem of pairing, and this problem must be solved easily and economically together with the problem of deflection linearity.

Japanese Published Unexamined patent application No. 54-96329 discloses a display unit for minimizing display distortion by the addition of a compensating circuit controlling deflection current in response to the fluctuation of the anode voltage. This prior art suggests the method for controlling the amplitude of the deflection current by supplying a voltage $$V_B = K_B \sqrt{V_H}$$

($K_B$:constant) determined as a function of the square root of the anode voltage $V_H$ to a saw tooth wave generator for vertical deflection. However, only the concept is shown and the detailed technique for implementation is not disclosed. Further, no description is given as to how to correct both vertical deflection linearity and anode voltage variation. The problem of pairing is also not recognized.

SUMMARY OF THE INVENTION

It is therefore an object of this invention to provide a deflection distortion correction circuit which enables the correction of both deflection linearity and pairing easily and economically with a minimum number of components.

Said object can be achieved by this invention which uses cubic curve linearity correction. It was found that pairing can easily be corrected by the use of cubic curve linearity correction. The cubic curve linearity correcting circuit includes two multipliers for cubing a saw tooth wave and an adder for adding the cubed output to the saw tooth wave. In this invention, an adder for pairing correction is inserted between the two multipliers of the cubic curve correcting circuit. To one input of the adder, the squared output of the first multiplier is supplied, and to the other input of the adder, the signal indicating change in the anode voltage is supplied. The output of the adder is supplied to one input of the second multiplier. The second multiplier receives the saw tooth wave to the other input thereof, and the multiplied output is added to the saw tooth wave. The added output is supplied to the output linear amplifier for driving the deflecting coil.

DETAILED DESCRIPTION

This invention will now be described in detail with reference to the preferred embodiment. First, the principle of this invention is described. Although it is assumed in this embodiment that raster scanning lines are horizontal and the linearity of vertical deflection and the pairing of horizontal scanning lines are corrected, it will easily be understood that this invention may equally be applied to the case where raster scanning lines are vertical and the linearity of horizontal deflection and the pairing of vertical raster scanning lines are corrected.

Figure 1:
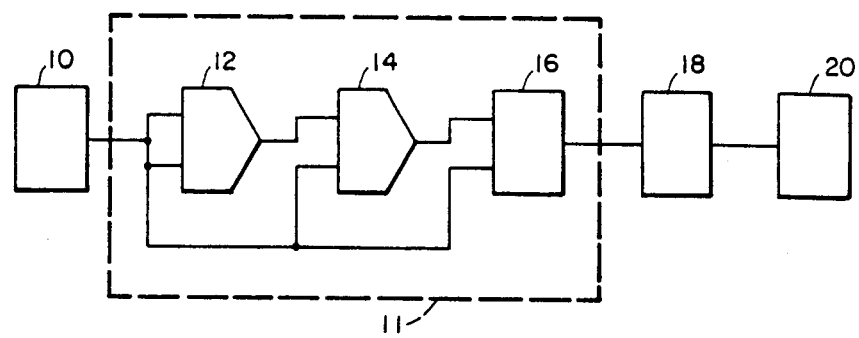
FIG. 1 is a block diagram of a conventional vertical deflection circuit having a cubic curve linearity correction circuit.

FIG. 1 shows a conventional vertical deflection circuit having a cubic curve vertical linearity correcting circuit 11. The saw tooth wave generator 10 generates a saw tooth wave for vertical deflection. The analog multiplier 12 squares the saw tooth wave and supplies the squared output to one input of the analog multiplier 14. The multiplier 14 receives the saw tooth wave from the saw tooth wave generator 10 at the other input, and supplies the cubed output of the saw tooth wave to one input of the analog adder 16. The adder 16 receives the saw tooth wave at the other input and supplies the added output to the vertical output linear amplifier 18. The amplifier 18 drives the vertical deflection coil 20. The multipliers and the adder can be constituted using an operational amplifier.

In this case, the vertical deflection yoke current $I_D(t)$ is given by the following equation:

$$I_D(t) = k(t - at^3) \quad (1)$$

where k is a deflection factor, and a is a cubic curve correction factor determined by the used CRT, the deflection yoke and the operating conditions. When a 17-inch CRT with a deflecting angle of 114° is used with its long axis placed vertically and interlaced scanning is performed at a line density of about 100 lines/3 cm, the values of a and t are: $a = 0.101$, and $-0.797 \leq t \leq +0.797$, respectively, while the value of k may vary depending on the deflection yoke and the anode voltage. Since the relation between the output voltage of the adder 16 and the deflection yoke current is linear, equation (1) indicates that the saw tooth wave voltage kt from the saw tooth generator 10 is subjected to the correction of the cubic curve component $kat^3$.

On the other hand, since the deflection angle of electron beam of the CRT is proportional to the deflection yoke current and is inversely proportional to the square root of the anode voltage, the deflection angle $\Theta_D$ can be given by the following equation:

$$\Theta_D = l \cdot I_D \cdot \frac{1}{\sqrt{V_A}} \quad (2)$$

where $I_D$ is the deflection yoke current, $V_A$ is the anode voltage and l is a constant.

If the anode voltage $V_A$ increases by $\Delta V_A$, the deflection angle $\Theta_D'$ is given by the following equation.

$$\Theta_D' = l \cdot I_D \cdot \frac{1}{\sqrt{V_A + \Delta V_A}} \quad (3)$$

Since $V_A >> \Delta V_A$ (normally $\Delta V_A/V_A$ is about $10^{-3}$), equation (3) can be approximated as follows:

$$\Theta_D' \approx l \cdot I_D \cdot \frac{1}{\left(1 + \frac{\Delta V_A}{2V_A}\right) \sqrt{V_A}} \quad (4)$$

If $\Theta_D = \Theta_D'$ regardless of the fluctuation of the anode voltage, pairing can be eliminated. The required vertical deflection yoke current $I_D'$ is led from equations (2) and (4) as follows:

$$I_D' = \left(1 + \frac{\Delta V_A}{2V_A}\right) I_D \quad (5)$$

Therefore, if the deflection yoke current is corrected as equation (5), pairing can be prevented.

When equation (1) is substituted for equation (5), the following equation is obtained:

$$I_D' = \left(1 + \frac{\Delta V_A}{2V_A}\right) k(t - at^3)$$

$$= kt + kt\left(\frac{\Delta V_A}{2V_A} - at^2\right) - ka\frac{\Delta V_A}{2V_A} t^3 \quad (6)$$

Although the third term $ka(\Delta V_A/2 V_A)t^3$ has some influence on the accuracy of correction, it is very small, and as described later, it can be adjusted finely to reflect this correction component in actual circuits. Therefore, it can be neglected on the constitution of basic circuits, and thus equation (6) can be approximated as follows:

$$I_D' \approx kt + kt\left(\frac{\Delta V_A}{2V_A} - at^2\right) \quad (7)$$

As apparent from equations (1) and (7), both vertical deflection linearity and pairing can practically be corrected if the correction component, $kt(\Delta V_A/2 V_A)$, is introduced to equation (1).

Figure 2:
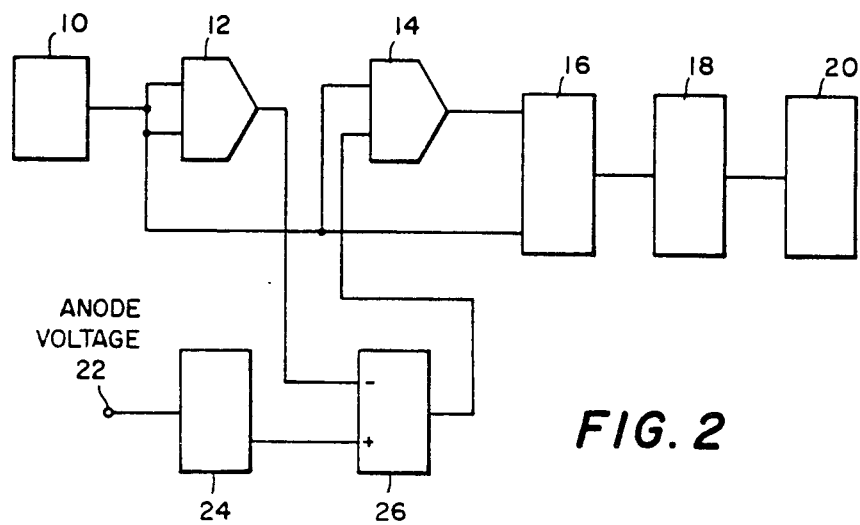
FIG. 2 is a block diagram of a vertical deflection circuit having a deflection distortion correcting circuit of this invention.

FIG. 2 is the block diagram of a vertical deflection circuit having a deflection distortion correcting circuit of this invention, and components corresponding to those in FIG. 1 are indicated with the same reference numbers. In this invention, an analog adder 26 for pairing correction is added. An anode voltage is applied to the terminal 22, and the circuit 24 generates a signal indicating the change in the anode voltage at the positive terminal of the adder 26. This signal corresponds to $(\Delta V_A/2 V_A)$ of equation (7). The negative terminal of the adder 26 is connected to the output of the multiplier 12. The multiplier 12 generates $at^2$ of equation (7) in response to the saw tooth wave voltage kt from the saw tooth wave generator 10. The output of the adder 26 is connected to one input of the multiplier 14. Therefore, the multiplier 14 generates $kt(\Delta V_A/2 V_A - at^2)$ and the adder 16 generates equation (7).

Figure 3:
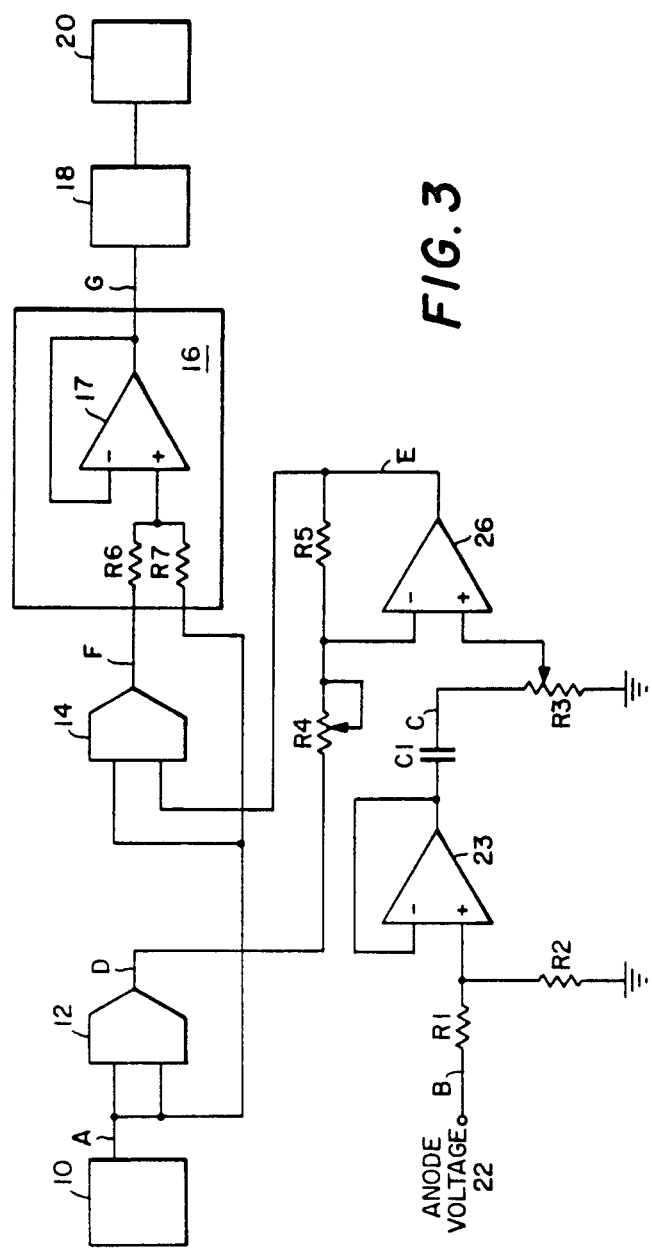
FIG. 3 is a circuit diagram of a vertical deflection circuit having a deflection distortion correcting circuit of this invention.
Figure 4A:
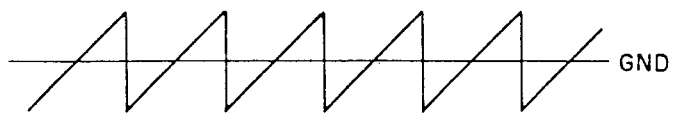
FIG. 4 illustrates waveforms at different points in the circuit of FIG. 3.
Figure 4B:
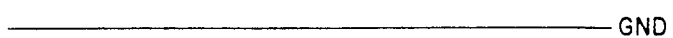
Figure 4C:
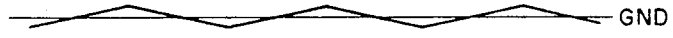
Figure 4D:
Figure 4E:
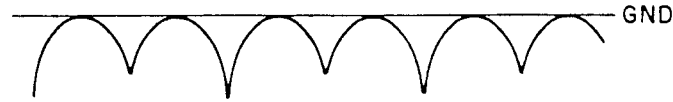
Figure 4F:
Figure 4G:
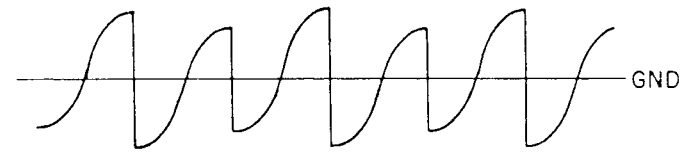

FIG. 3 shows the circuit configuration of a deflection distortion correcting circuit of this invention, and FIG. 4 illustrates operational waveforms as different points A–G in the circuit shown in FIG. 3. Note that FIG. 4 simply shows the waveforms and does not show the actual magnitudes. In FIG. 3, components corresponding to those in FIGS. 1 and 2 are indicated using the same reference numbers. An anode voltage (e.g. 19 kV) is supplied to the terminal 22. The anode voltage varies in response to the anode current. The waveform B in FIG. 4 shows an example of anode voltage variation. In actual operations, the anode voltage may vary in various patterns for each field.

The anode voltage B is lowered to about 1/4000 by voltage dividing resistors R1 and R2 and supplied through the buffer circuit 23 to the AC coupling capacitor C1 so that the voltage corresponding to the change of the anode voltage is taken out. This voltage is applied to the positive terminal of the adder 26 by the variable resistor R3. The waveform at the point C in the circuit is shown in FIG. 4 as waveform C. The resistors R1 and R2 are of 400 MΩ and 100 kΩ, respectively.

The output (waveform D) of the multiplier 12 which receives the saw tooth wave (waveform A) is applied to the negative terminal of the adder 26 through the variable resistor R4, and the adder 26 supplies the output E to one input of the multiplier 14. The resistor R5 is the feedback resistor of the adder 26.

The adder 16 consists of summing resistors R6 and R7 and a buffer circuit 17, and receives the output F of the multiplier 14 through the resistor R6, and the saw tooth wave A through the resistor R7. The adder 16 supplies the output waveform G to the vertical output linear amplifier 18. Buffer circuits 17 and 23 are current amplifiers for impedance conversion.

The variable resistor R4 is used for controlling vertical linearity, and the variable resistor R3 is used for controlling pairing. By adjusting the variable resistor R3, the third term of equation (6), $ka(\Delta V_A/2\ V_A)t^3$, which has been neglected can be compensated to a certain extent. This can be done by adjusting the factor of $V_A'$ "2", in equation (7) with the resistor R3. When the factor of $V_A$ is represented by x and the deflection yoke current is represented by $I_D''$, equation (7) can be rewritten as equation (8).

$$I_D'' = kt + kt\left(\frac{\Delta V_A}{xV_A} - at^2\right) \quad (8)$$

In equation (8), if x is determined so that the difference between $I_D'$ and $I_D''$ is minimum under the given conditions (a=0.101, $-0.797 \leq t \leq 0.797$), the approximation error can be minimized. In this example, x≃2.09. In actual operations, the resistor R3 may be finely adjusted while visually checking the test pattern displayed.

According to this invention, therefore, pairing can be corrected very easily by introducing the change in the anode voltage into the $at^2$ component of the cubic curve linearity correction. Although an approximation method is used in this invention, correction with sufficiently high accuracy can be made. When the long axis of a 17-inch CRT with a deflection angle of 114° is used in the vertical direction and 2:1 interlaced scanning at a line density of 100 lines/3 cm is made, it was found that no pairing occurs if anode voltage fluctuation is within ±1.5%. This is a range easily achievable with a conventional feedback type stabilized power source.

Although a preferred example is described above, it will be recognized that this invention can be applied to deflection distortion correction using interlaced scanning other than 2:1. It will also be understood that this invention can be applied to horizontal deflection circuit with vertical raster scanning lines and more generally, to any deflecting circuit for deflecting the beam perpendicularly to raster scanning lines.

What is claimed is:

1. A deflection distortion correcting circuit for a deflecting circuit for cathode ray tube display using interlaced scanning and having a circuit for generating a saw tooth wave for deflecting an electron beam in the direction perpendicular to raster scanning lines and an output linear amplifier circuit for driving the deflecting coil, the improvement comprising:

first multiplying means for generating a squared output in response to said saw tooth wave, second multiplying means for receiving said saw tooth wave at one input thereof, first adding means having an output connected to said output linear amplifier circuit and for adding the output of said second multiplying means to said saw tooth wave, means responsive to the anode voltage of said cathode ray tube to generate a signal indicating the change of the anode voltage, second adding means for generating the difference between the output of said first multiplying means and said signal indicating the change of the anode voltage, and means for connecting the output of said second adding means for the other input of said second multiplying means.

* * * * *